United States Patent
Suematsu et al.

(10) Patent No.: US 7,627,696 B2
(45) Date of Patent: Dec. 1, 2009

(54) ELECTRONIC DEVICE, METHOD FOR CONTROLLING THE SAME, INFORMATION PROCESSING APPARATUS, AND COMPUTER PROGRAM

(75) Inventors: Toshinari Suematsu, Saitama (JP); Masashi Sugasawa, Chiba (JP); Toshiyuki Mochizuki, Kanagawa (JP); Hiroyuki Hidenaga, Tokyo (JP)

(73) Assignee: Sony Corporation, Tokyo (JP)

( * ) Notice: Subject to any disclaimer, the term of this patent is extended or adjusted under 35 U.S.C. 154(b) by 410 days.

(21) Appl. No.: 11/124,289

(22) Filed: May 9, 2005

(65) Prior Publication Data

US 2005/0267999 A1    Dec. 1, 2005

(30) Foreign Application Priority Data

May 25, 2004    (JP)    ............................. 2004-155300

(51) Int. Cl.
*G06F 3/00* (2006.01)
(52) U.S. Cl. .......................... 710/14; 320/114; 320/132; 320/137
(58) Field of Classification Search .................. 710/14, 710/17
See application file for complete search history.

(56) References Cited

U.S. PATENT DOCUMENTS 6,531,845 B2 *   3/2003   Kerai et al. ................. 320/107
2002/0113575 A1 *   8/2002   Lee ............................ 320/132
2003/0063196 A1 *   4/2003   Palatov et al. ............ 348/211.2
2004/0063464 A1 *   4/2004   Akram et al. ................ 455/559

OTHER PUBLICATIONS

Canon, "PowerShot G1, Camera User Guide", 2000, pp. 8, 18, 19, 24, 29, 47, 49, 117, 119, 120, 125 and 127.*
Canon, "Software Starter Guide", 2000, pp. 6 and 49.*

* cited by examiner

*Primary Examiner*—Henry W. H. Tsai
*Assistant Examiner*—Elias Mamo
(74) *Attorney, Agent, or Firm*—Oblon, Spivak, McClelland, Maier & Neustadt, L.L.P.

(57) ABSTRACT

An electronic device can operate as an external device of an information processing apparatus. The electronic device includes a connecting unit for connecting to the information processing apparatus, a command processor for processing a command sent from the information processing apparatus through the connecting unit, a rechargeable battery, a charging controller for controlling a charging operation of the rechargeable battery, and an operating mode managing unit which, when the connecting unit is connected to an interface having a power-supply function, selects one of a normal operating mode in which the electronic device operates as the external device of the information processing apparatus, and a charging mode in which the electronic device stops operating as the external device of the information processing apparatus and charges the rechargeable battery. The command processor processes the command in accordance with the selected operating mode.

15 Claims, 11 Drawing Sheets

ELECTRONIC DEVICE, METHOD FOR CONTROLLING THE SAME, INFORMATION PROCESSING APPARATUS, AND COMPUTER PROGRAM

CROSS REFERENCES TO RELATED APPLICATIONS

The present invention contains subject matter related to Japanese Patent Application JP 2004-155300 filed in the Japanese Patent Office on May 25, 2004, the entire contents of which are incorporated herein by reference.

BACKGROUND OF THE INVENTION

1. Field of the Invention

The present invention relates to electronic devices driven by rechargeable batteries, methods for controlling the electronic devices, information processing apparatuses, and computer programs. In particular, the present invention relates to an electronic device which can be externally connected to an information processing apparatus, such as a personal computer, and which can be supplied with charging power by the information processing apparatus, and to a method for controlling the electronic device. The present invention also relates to the information processing apparatus and a computer program.

More specifically, the present invention relates to an electronic device which operates as a peripheral device when being externally connected to an information processing apparatus such as a personal computer, and which performs a self-driven operation, and to a method for controlling the electronic device. The present invention also relates to the information processing apparatus and a computer program. In particular, the present invention relates to an electronic device which includes a storage device, such as a hard disk unit, for storing data and content, which operates as an external storage device when being connected to an information processing apparatus such as a personal computer, and which itself can perform data and content processing such as content playback, and to a method for controlling the electronic device. The present invention also relates to the information processing apparatus and a computer program.

2. Description of the Related Art

With current technical innovation, various types of personal computers, such as desktop computers and notebook computers, have been developed and made commercially available. An apparatus of the above type includes an interface for connecting peripheral devices. By using this interface to add on various peripheral devices such as a keyboard, a mouse, a printer, and a modem, the operating environment can be improved and hardware resources can be provided in the apparatus.

Although a serial port, a parallel port, etc., have been known as personal computer interfaces, recently, the Universal Serial Bus (USB) has rapidly become widespread. In addition, USB devices are of various types, such as keyboards, mice, printers, scanners, modems, hard disk drives, CD-RW drives, and DVD drives. USB has features in that a USB cable is relatively thin since USB is a serial bus, that a hub is used to enable tree connection of peripheral devices, and that USB supports various transfer modes. Accordingly, USB is widely recognized as a multi-purpose interface.

Regarding devices connected by USB, devices that are connected by using a USB port or a USB cable are classified into a USB host positioned upstream and USB devices positioned downstream. In other words, a USB host controls a USB device connected thereto by sending a command to the USB device, and the USB device operates as instructed by the USB host. In USB, in addition to data lines (D+, D−), power-supply lines called "VBUS" and "GND" for supplying power from a host to a device are provided.

By using VBUS, power with a maximum current rating of 500 mA can be supplied from a USB host to a USB device. A device that operates by using power supplied from VBUS is called a "USB bus power device". The current supplied from VBUS is a maximum of 100 mA for a low-power port, and is a maximum of 500 mA for a high-power port.

However, the USB standard has the limitation that, just after connecting a USB device to a USB host through a USB cable, it is necessary for a current for use from VBUS to be 100 mA or greater. In the case of a high-power device that consumes a current (from VBUS) greater than 100 mA, the high-power device operates at a current not greater than 100 mA just after being connected to the USB host. After initial processing called "Configuration" ends and it is confirmed that a port to which the high-power device is connected is a high-power port, the high-power device can consume a current of greater than 500 mA.

By using VBUS, a portable electronic device, such as a cellular phone, can be charged (see, for example, Japanese Unexamined Patent Application Publication Nos. 2000-201204 and 2000-339067). However, among existing high-power devices, there are many devices which only have simple functions such as charging or lighting a lamp, and in which, if at least a current is supplied from VBUS, they use the supplied current, even though they are not recognized as valid USB devices by the USB host. The above devices do not perform a Configuration procedure for the USB host. Thus, although the above devices are connected through a USB cable, the USB host does not recognize them, and thus does not access them. However, they fail to satisfy the USB device standard. When they are connected to a low-power port, they attempt to consume a current greater than the supplying capacity of the port. This may cause a malfunction in the host (hub) and USB devices connected thereto. To prevent this problem, even if they have simple functions such as charging, they need to each have a function of being recognized as a valid USB device.

USB devices include those that have self-driven functions other than functions of operating as peripheral devices of a USB host, such as a personal computer, by using a USB cable. One example of those is a battery-operated portable media player having a built-in hard disk drive.

An electronic device of the above type operates as an external hard disk unit while being connected to a personal computer through a USB cable. When being disconnected from the USB cable (or remaining connected to the USB cable), this electronic device operates as a media player in a stand-alone state and can play back and output content such as video and music on a hard disk.

In addition, the reason that the electronic device of the above type is connected to the USB cable is that it normally operates as a USB device such as a USB hard disk unit, that is, a peripheral device of the personal computer, and that it obtains power necessary in the stand-alone state, that is, it charges its built-in battery by using power obtained from the personal computer through VBUS. In this specification, a state in which an electronic device connected to a USB cable operates as a USB device is called a "normal mode", and a state in which the electronic device charges a battery after stopping operating as the USB device is called a "charging mode".

For example, an electronic device (see, for example, Japanese Unexamined Patent Application Publication No. 2003-61256) has been proposed in which, when the electronic device is set as a slave in USB data transfer and is set in the normal operating mode, the electronic device supplies, from a USB power-supply line, power from a power supply or storage battery, or power from an external power supply, to a data transfer control circuit for controlling USB data transfer, and in which, when the electronic device is set as a slave in USB data transfer and is in the charging mode, the electronic device supplies power from the USB power-supply line to the storage battery.

Here, by using a USB hard disk unit as an example, its operation in the charging mode is considered.

In the charging mode, in order to increase charging efficiency, the power of a hard disk drive is turned off and a current supplied through VBUS is supplied not to the hard disk unit but to the rechargeable battery.

After being connected to the USB cable, the hard disk unit serves as a valid USB device to perform a Configuration procedure. Thus, the USB host, such as a personal computer, correctly recognizes the USB hard disk unit as a mass storage unit. Accordingly, the USB host issues various commands such as normal disk accessing for reading from and writing to the hard disk.

However, in the charging mode, it is difficult for the hard disk unit to perform any operation since its power is off. Accordingly, the hard disk unit performs processing such as not responding to commands and sending back an error. If a basic command, such as reading from or writing to the hard disk, is not correctly executed, such a state is treated as a serious defect in the USB host. This results in problems such as inability of the system to respond for seven seconds or longer until time-out of the command, and occurrence of a system malfunction due to serious errors.

When, in the charging mode, a response for the USB hard disk unit is not corrected, a USB device response does not need to be changed in accordance with a mode. Although this eliminates a time to create a USB program for the charging mode, the above problems occur.

To avoid such problems, in the charging mode, when being accessed by the host, the electronic device need not be recognized as having a device malfunction. Accordingly, it is necessary for the USB host to recognize the electronic device as a USB device different from that in the normal mode. In the case of completely different programs (firmware) between the charging mode and the normal mode, the number of steps for development and evaluation increases, and, in addition, a problem occurs, such as the need to increase the size of a memory for storing programs for controlling the USB controller.

SUMMARY OF THE INVENTION

It is desirable to provide an excellent electronic device which is externally connected to an information processing apparatus such as a personal computer, and which can be supplied with charging power, a method for controlling the electronic device, the information processing apparatus, and a computer program.

It is further desirable to an excellent electronic device which can operate as a peripheral device in a state externally connected to an information processing apparatus such as a personal computer, and which can perform a self-driven operation, a method for controlling the electronic device, the information processing apparatus, and a computer program.

It is further desirable to an excellent electronic device which includes a built-in battery and an interface for externally connecting to an information processing apparatus, and which can selectively operate in one of a normal mode in which, when the electronic device is connected to an interface having a power-supply function, the electronic device serves as an externally connected peripheral device to perform a standard operation so that the information processing apparatus, which issues a command, does not have any malfunction, and a charging mode in which the electronic device charges the built-in battery by using power supplied from the interface, a method for controlling the electronic device, the information processing apparatus, and a computer program.

According to a first embodiment of the present invention, there is provided an electronic device capable of operating as an external device of an information processing apparatus, the electronic device including a connecting means for connecting to the information processing apparatus, a command processing means for processing a command sent from the information processing apparatus through the connecting means, a rechargeable battery, a charging control means for controlling a charging operation of the rechargeable battery, and an operating mode managing means which, when the connecting means is connected to an interface having a power-supply function, selects one of a normal operating mode in which the electronic device operates as the external device of the information processing apparatus, and a charging mode in which the electronic device stops operating as the external device of the information processing apparatus and charges the rechargeable battery, wherein the command processing means processes the command in accordance with the selected operating mode.

For example, the electronic device according to the embodiment of the present invention has a built-in battery. When the electronic device is connected to an interface having a power-supply function by the connecting unit, the operating mode managing means may select one of a normal operating mode in which the electronic device operates as the external device of the information processing apparatus, and a charging mode in which the electronic device stops operating as the external device of the information processing apparatus and charges the rechargeable battery.

The electronic device according to the embodiment of the present invention may further include a hold switch for designating one of enabling and disabling of a key operation in a state in which the electronic device is self-driven.

When the electronic device is not connected to the information processing apparatus by the connecting means, by operating the hold switch, enabling and disabling of a key operation in a state in which the electronic device is self-driven may be set.

When the electronic device is connected to the information processing apparatus by the connecting means, in an off state of the hold switch, the operating mode managing means may select the normal operating mode in which the electronic device operates as the external device of the information processing apparatus, while, in an on state of the hold switch, the operating mode managing means may select the charging mode in which the electronic device stops operating as the external device of the information processing apparatus and charges the rechargeable battery.

This eliminates the need of the electronic device to further include a mode selecting switch, so that the number of switches can be reduced.

According to a second embodiment of the present invention, there is provided a computer program described in a computer-readable form for executing, on a computer system, control of an electronic device including a rechargeable battery and being capable of operating as an external device of an information processing apparatus. The computer program includes the steps of, when the electronic device is connected to an interface having a power-supply function, performing operating-mode management by selecting one of a normal operating mode in which the electronic device operates as an external device of the information processing apparatus, and a charging mode in which the electronic device stops operating as the external device and charges the rechargeable battery, and performing command processing in accordance with the selected operating mode.

The computer program according to the second embodiment of the present invention is a definition of a computer program described in a computer-readable form so as to implement predetermined processing on the computer system. In other words, by installing, into a computer system, the computer program according to the second embodiment of the present invention, the computer system has cooperative operation. Therefore, operation and advantages similar to those in the electronic device according to the first embodiment of the present invention can be obtained.

According to an embodiment of the present invention, an excellent electronic device which is externally connected to an information processing apparatus such as a personal computer, and which can be supplied with charging power, a method for controlling the electronic device, the information processing apparatus, and a computer program can be provided.

In addition, according to an embodiment of the present invention, an excellent electronic device which can operate as a peripheral device in a state externally connected to an information processing apparatus such as a personal computer, and which can perform a self-driven operation, a method for controlling the electronic device, the information processing apparatus, and a computer program can be provided.

An electronic device according to an embodiment of the present invention includes a built-in battery and an interface for externally connecting to an information processing apparatus, and can selectively operate in one of a normal mode in which, when the electronic device is connected to an interface having a power-supply function, the electronic device serves as an externally connected peripheral device to perform a standard operation so that the information processing apparatus, which issues a command, does not have any malfunction, and a charging mode in which the electronic device charges the built-in battery by using power supplied from the interface, a method for controlling the electronic device, the information processing apparatus, and a computer program.

By way of example, when the electronic device is a USB hard disk unit, in the normal mode, the electronic device operates as a virtual mass storage unit, and, in the charging mode, the electronic device operates as a virtual removable storage unit. In this case, by minimizing a difference between firmware implementing the charging mode and firmware of the normal mode, the number of steps for development and a memory for programs can be saved.

In addition, when, in the charging mode, the electronic device receives a command which is not supported, the electronic device performs emulation so as to send back an error indicating that no medium is loaded in the removable storage unit, whereby the information processing apparatus can be prevented from malfunctioning.

Other features and advantages of the present invention will become apparent by a more detailed description based on embodiments of the present invention and the accompanying drawings.

DESCRIPTION OF THE PREFERRED EMBODIMENTS

An embodiment of the present invention is directed to an electronic device which can be externally connected to a personal computer and which can operate as a peripheral device. An embodiment in which USB is used as a peripheral device interface for personal computer is described below.

An electronic device according to the embodiment of the present invention can operate as a valid USB device. In other words, just after the electronic device, which is a USB device, is connected to a personal computer used as a USB host, the electronic device operates at a current from VBUS of not greater than 100 mA. After that, the electronic device performs a Configuration procedure for the USB host. When it is confirmed that a port to which the electronic device is connected is a high-power port, the electronic device starts to operate at 500 mA or greater.

In addition, the electronic device according to this embodiment is a USB hard disk unit including a hard disk drive. When the electronic device according to this embodiment is connected to a USB cable, it operates as a mass storage unit for the USB host such as a personal computer.

The electronic device according to this embodiment operates, not only as the USB hard disk unit when being connected to the USB cable, but also as a battery-operated portable media player having a built-in hard disk drive. Accordingly, in the electronic device, content such as video and music, on the hard disk, can be played back.

When being connected to the USB cable, the electronic device according to this embodiment has a normal mode in which this electronic device normally operates as a USB hard disk unit for the USB host such as a personal computer, and a charging mode in which a built-in battery of this electronic device is charged by using a power-supply line of the USB interface. In the charging mode, the power of the hard disk unit is off.

In addition, since the electronic device according to this embodiment serves as a valid USB device to perform the Configuration procedure, a command is issued from the USB host obviously in the normal mode and even in the charging mode.

In the charging mode, the power of the hard disk unit is off, so that the electronic device according to this embodiment is completely unable to perform any operation, and does not respond to a command. Accordingly, the personal computer has a problem in that a system malfunction due to serious error may occur. In this embodiment, as described below, processing on a command from the USB host is emulated for preventing the USB host from recognizing that the USB device in the charging mode is in malfunction.

Firmware in the charging mode for realizing this emulating operation can save the number of steps for development and the size of a memory for programs since it can minimize a difference from firmware in the normal mode.

An embodiment of the present invention is fully described below with reference to the accompanying drawings.

Figure 1:
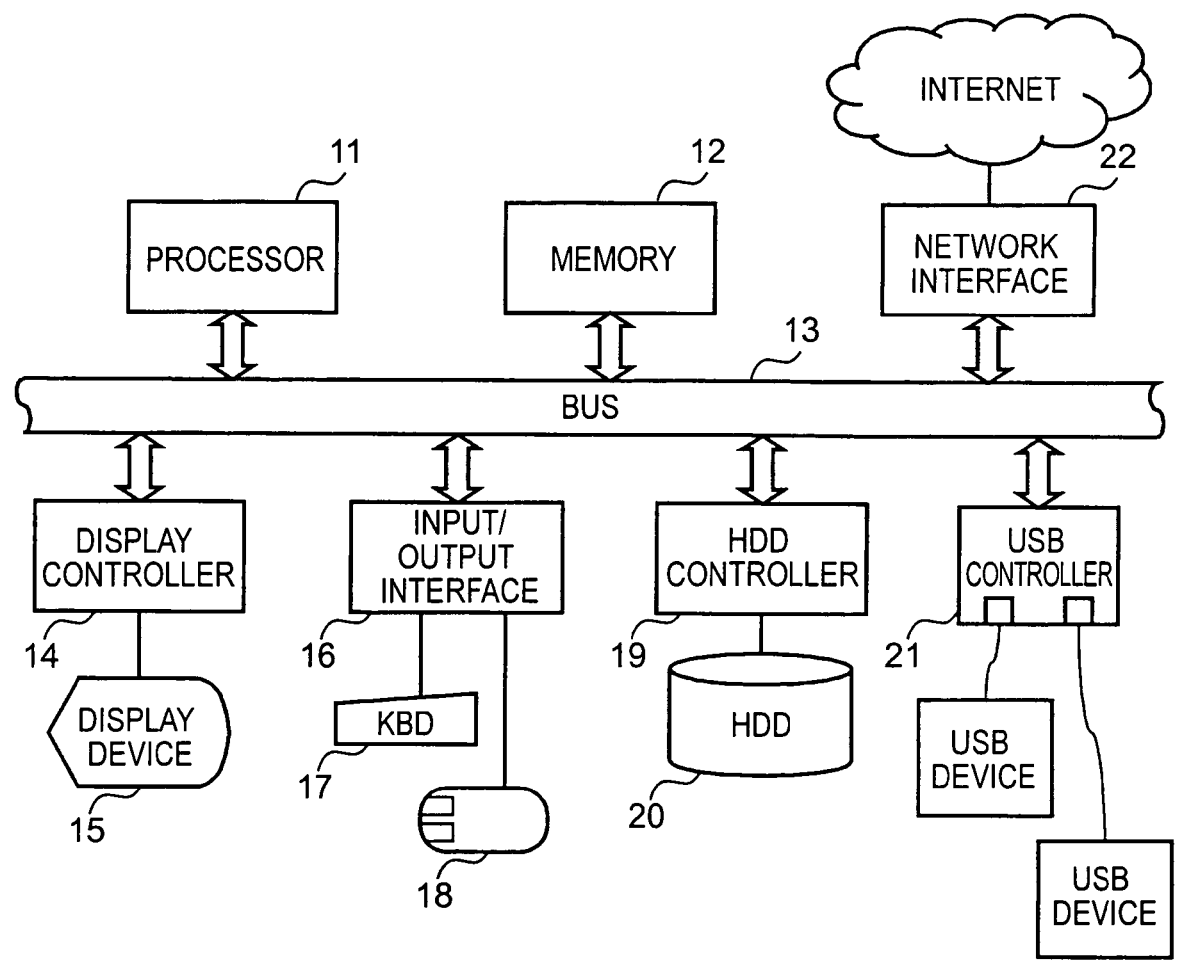
FIG. 1 is a block diagram showing the hardware configuration of a personal computer.

FIG. 1 shows the schematic hardware configuration of a personal computer.

This system has a processor 11 as a core. The processor 11 executes various types of processing based on programs stored in a memory 12 in a program execution environment provided by an operating system (OS). The processor 11 controls various types of peripheral devices connected through a bus 13. The peripheral devices connected through the bus 13 include the following devices.

A memory 12 is formed by, for example, a semiconductor memory such as a dynamic RAM (random access memory). The memory 12 is used to load program code which is to be executed by the processor 11 and to temporarily store working data of an executing program. The memory 12 forms a memory space for the processor 11.

A display controller 14 generates a display image in accordance with an image drawing command sent from the processor 11 and sends the display image to a display device 15. The display device 15, which is connected to the display controller 14, displays the image on its screen in accordance with information of the display image sent from the display controller 14.

In this embodiment, the display controller 14 supports a bit-map display format, and the OS provides a GUI (graphical user interface) operating environment on the screen of the display device 15. Accordingly, on the desktop, a plurality of icons which represent an application, other programs, and hardware resources such as a printer are displayed. By directly applying an operation on an icon, a user can initiate desired processing. In addition, the desktop includes status icons indicating the operating statuses of peripheral devices connected by the interface, thus enabling the user to visually monitor the system status. In this embodiment, the display device 15 also displays dedicated icons (described later) that indicate charging states, etc., of peripheral devices connected to an interface having a power-supply function.

An input/output interface 16 connects to a keyboard 17 and a mouse 18, and transfers input signals from the keyboard 17 and the mouse 18 to the processor 11.

A network interface 22 is connected to a local area network (LAN) and an external network such as the Internet, and controls data communication via the Internet. In other words, the network interface 22 transfers data transferred from the processor 11 to another device, and receives and transfers, to the processor 11, data sent through the Internet. For example, the network interface 22 can receive programs and data from the exterior through the network.

A hard disk drive (HDD) controller 19 connects to a mass storage unit such as a HDD 20, and controls input/output of data from/to the HDD 20 connecting to the HDD controller 19. The HDD 20 stores programs included in the OS, which are to be executed by the processor 11, application programs, driver programs, and, in addition, data and content, which are to be referred to or played back by programs.

A USB controller 21 includes at least one USB port, and realizes an interface protocol between a USB device connected through a USB cable and the bus 13. USB has features in that a USB cable is relatively thin since USB is a serial bus, that a hub is used to enable tree connection of peripheral devices, and that USB supports various transfer modes. Accordingly, USB is widely recognized as a general purpose interface.

In USB, in addition to data lines (D+, D−), power-supply lines called "VBUS" and "GND" for supplying power from a host to a device are provided. In other words, the USB interface has a power-supply function. The USB interface can supply a maximum of 500 mA at 5 V from the USB host to the USB device by using VBUS.

USB devices include keyboards, mice, printers, scanners, modems, hard disk drives, CD-RW drives, and DVD drives. In addition, USB devices include those that have self-driven functions other than functions of operating as peripheral devices connected through the USB cable. For example, one of those is a USB hard disk unit that operates also as a portable media player. Many USB devices that also have self-driven functions are battery-operated and can be charged via VBUS.

However, the USB standard has the limitation that, just after connecting a USB device to a USB host through a USB cable, a current from VBUS for use needs to be not greater than 100 mA. In the case of a high-power device that consumes the current from VBUS greater than 100 mA, the high-power device operates at not greater than 100 mA just after being connected to a USB host. After initial processing called "Configuration" ends and it is confirmed that a port to which the high-power device is connected is a high-power port, the high-power device can consume a current of greater than 500 mA. The USB device, which has performed the Configuration procedure, is recognized as a USB host by the personal computer. For example, after the USB hard disk unit is recognized by the Configuration procedure, it is put under the control of a file system, enabling ordinary file accessing.

In order to form an information processing apparatus such as a personal computer, many electric circuits, etc., other than those shown in FIG. 1, are needed. However, they are well-known to persons skilled in the art and are not included in the gist of the present invention. Accordingly, their description is omitted in this specification. In addition, to avoid complexity in the drawings, it is to be understood that only portions between hardware blocks are shown.

Figure 2:
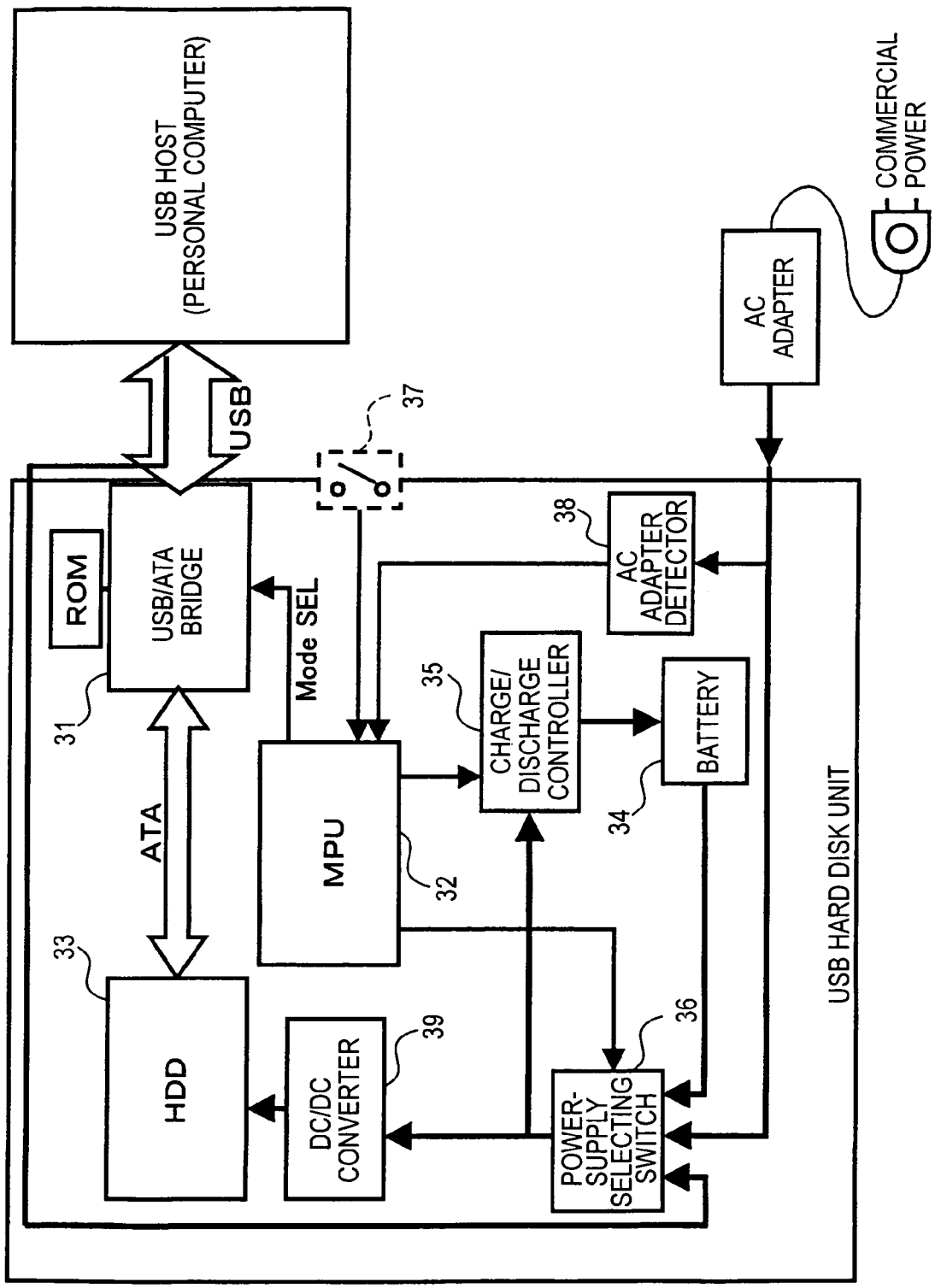
FIG. 2 is a block diagram showing the hardware configuration of a USB device according to an embodiment of the present invention.

FIG. 2 shows the schematic hardware configuration of a USB device as an electronic device according to an embodiment of the present invention.

The USB hard disk unit according to this embodiment is a USB device including a hard disk drive. When being connected to a USB cable, the USB hard disk unit serves as a valid USB device to perform a Configuration procedure, whereby it can be recognized by the personal computer and can operate as a mass storage unit. In other words, the USB hard disk unit has a normal mode in which it normally operates as a USB hard disk unit for the personal computer, and a charging mode in which it charges a built-in battery by using a power-supply line of a USB interface. In the charging mode, the power of the hard disk unit is off.

This USB hard disk unit also has a self-driven function. Accordingly, this USB hard disk unit serves as a battery-operated portable media player having a built-in hard disk drive, and can play back content, such as video and music, on the hard disk.

The USB hard disk unit shown in FIG. 2 includes a USB/ATA bridge 31, a microprocessor unit (MPU) 32, a HDD 33, a battery (rechargeable battery) 34, a charge/discharge controller 35, a power-supply selecting switch 36, a hold switch (mode changeover switch) 37, and an AC adapter detector 38.

The USB/ATA bridge 31 is a protocol conversion IC for using the HDD 33 (for an ATA interface) by connecting it to the USB interface. The USB/ATA bridge 31 is implemented by using, for example, a USB controller IC and a multipurpose single-chip microcomputer. The USB/ATA bridge 31 can execute predetermined processing by loading, into a built-in RAM (not shown), firmware stored in a built-in ROM (not shown) or an external ROM. For example, the USB/ATA bridge 31 has beforehand, as firmware stored in the built-in ROM, functions necessary for allowing a storage unit, such as the HDD 33, to operate as a device based on the USB mass storage class standard. In addition, by using a rewritable external ROM, a USB device program, such as firmware in the charging mode, can be relatively easily and inexpensively changed.

Advanced Technology Attachment (ATA) is a standard obtained by standardizing the Integrated Device Electronics (IDE), which is a substantial standard for connecting a hard disk drive to a bus in a personal computer.

The MPU 32 is a main controller for integrated control of operations of the entire USB hard disk unit. The MPU 32 mainly performs selective switching of power supplies (VBUS, the battery, and an AC adapter) by using the power-supply selecting switch 36, operating-mode management in accordance with connection or disconnection of the USB cable (USB host) to the hold switch 37 and the USB/ATA bridge 31, operating control in a self-driven mode such as playback of content such as video and music stored in the HDD 33, power management, such as a charging and discharging operation of the battery 34 and a power-supply operation by the AC adapter (external commercial power supply), etc.

The battery 34 is used as a main power supply when the USB hard disk unit operates, not as a peripheral device of a personal computer to which the USB hard disk unit is connected, but as a single device in a non-USB-connection mode by the self-driven function. For example, a rechargeable battery, such as a lithium ion battery, is used as the battery 34.

The charge/discharge controller 35 supplies an input current to the battery 34 in the charging mode, and controls an output current from the battery 34 in a battery-operated mode, that is, a discharging mode.

The power-supply selecting switch 36 outputs, to a DC/DC converter, one of 5-volt power supplied through VBUS in the USB cable and 5-volt power from common commercial power supply through the AC adapter, and the battery 34.

The hold switch 37 is a handler for designating enabling/disabling of a key operation in the self-driven mode, and is provided for preventing a false operation of an operating key (not shown) in the case of using the self-driven function to play back content.

The AC adapter detector 38 detects whether the external power is supplied from the common commercial power supply through the AC adapter. Based on a detection output from the AC adapter detector 38, the MPU 32 can determine operation of the USB hard disk unit by using the AC adapter or battery charging, or operation of the USB hard disk unit by using power supplied from VBUS of the USB cable or battery charging. In the normal mode, the USB hard disk unit constantly operates regardless of whether the AC adapter is used. In the charging mode, when the AC adapter is connected to the USB hard disk unit, the USB hard disk unit is driven by external power obtained from the AC adapter without using VBUS.

The DC/DC converter 39 converts an input 5-volt voltage into a voltage (e.g., 3.3 V) for driving each portion such as the HDD 33, and supplies as driving power to the portion. However, in the charging mode, the DC/DC converter 39 stops power supply to the HDD 33 based on an instruction from the MPU 32.

The USB hard disk unit has a display (not shown) and speaker for outputting vide and audio obtained when the self-driven function is used to play back content, and a user interface for performing key operations such as playback, stop, fast forwarding, and rewinding.

When being connected to the personal computer through the USB interface, the USB hard disk unit according to this embodiment operates as a USB device, that is, a mass storage unit. However, even when being not connected to the USB interface, the USB hard disk unit according to this embodiment has a self-driven function of being used alone as a music player. The battery 34 is used when the USB hard disk unit according to this embodiment operates alone. In addition, the hold switch 37 prevents a malfunction occurring due to a false press of a key when the USB hard disk unit according to this embodiment operates alone.

The hold switch 37 is useless in a state connected to the USB interface. By using this feature, the normal mode and the charging mode can be switched in accordance with the state of the hold switch 37 when the USB hard disk unit is connected to the USB host. In other words, the hold switch 37 servers as a mode changeover switch in the state connected to the USB interface. This can reduce the number of switches. Obviously, in addition to the hold switch 37, a mode changeover switch may be separately provided.

Figure 3:
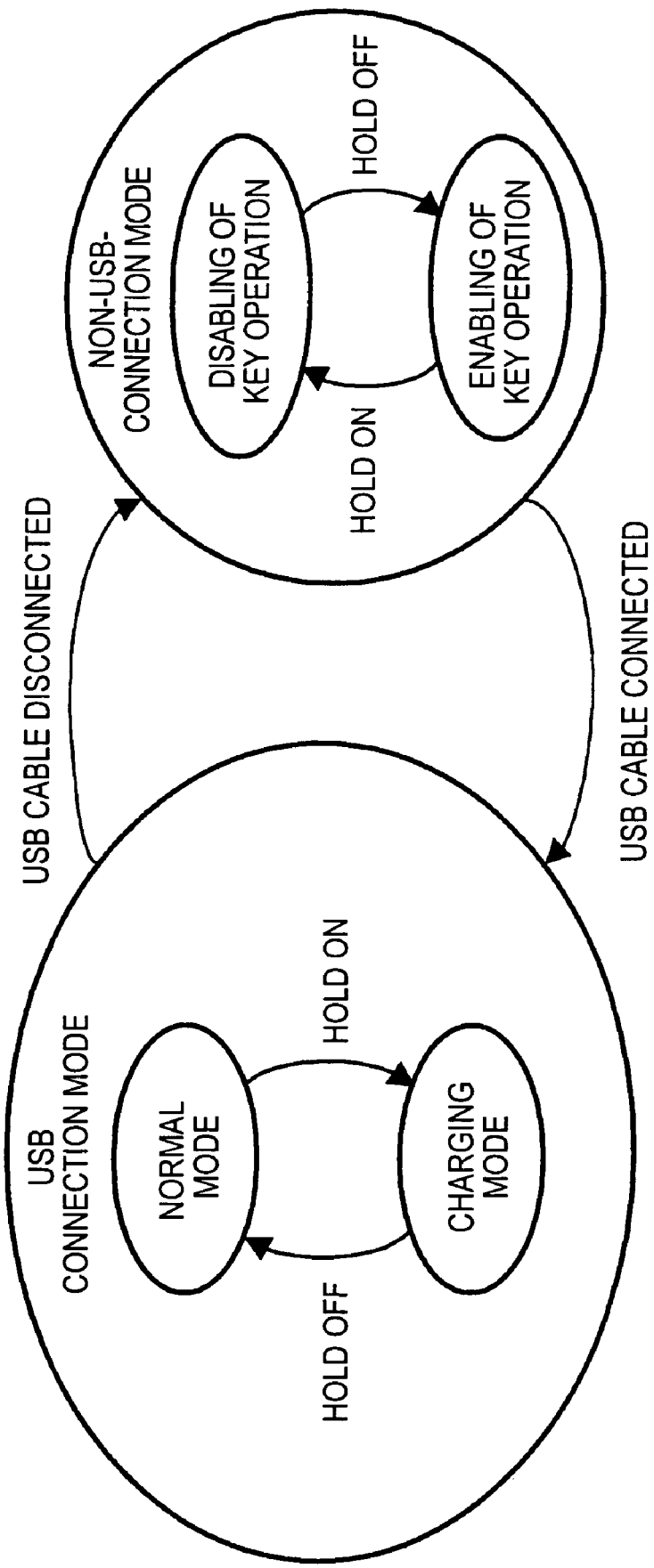
FIG. 3 is an illustration of an operating mode change of a USB hard disk unit according to an embodiment of the present invention.

FIG. 3 shows an operating mode change of the USB hard disk unit according to this embodiment.

As shown in FIG. 3, the operating modes of the USB hard disk unit are broadly divided into a USB connection mode in which the USB hard disk unit is connected to the personal computer through the USB interface, and a non-USB-connection mode in which the USB hard disk unit is disconnected from the USB cable.

In the non-USB-connection mode, the USB hard disk unit is free from the control of the personal computer, which serves as a USB host, and can operate alone as a portable media player.

As shown in FIG. 3, in the non-USB-connection mode, the USB hard disk unit has a self-driven mode in which the hold switch 37 is off and the USB hard disk unit operates alone as a portable media player, and a hold mode in which the hold switch 37 is off and key operation is prohibited. In other words, by turning on the hold switch 37, the USB hard disk unit changes to the hold mode, and, by turning off the hold switch 37, key operation is allowed and the USB hard disk unit changes to the self-driven mode.

In the USB connection mode, the USB hard disk unit is supplied with driving power from VBUS of the USB cable, and can operate as a mass storage unit of the personal computer as the USB host.

As shown in FIG. 3, in the USB connection mode, the USB hard disk unit has a normal mode in which, by turning off the hold switch 37, the USB hard disk unit is allowed to operate as a peripheral device of the personal computer, that is, a mass storage unit, and a charging mode in which, by turning on the hold switch 37, the USB hard disk unit is stopped to charge the battery 34. In the charging mode, driving power supply to the HDD 33 is stopped. In other words, after turning on the hold switch 37, and by connecting the USB cable, the USB hard disk unit changes to the charging mode.

The above description is summarized by the following table.

|  | Hold Switch 37 Is On | Hold Switch 37 Is Off |
|---|---|---|
| Non-USB Connection | Key Operation Disabled | Key Operation Enabled |
| USB Connection | Charging Mode | Normal Mode |

The normal mode and charging mode in the USB connection mode are described below. At first, the normal mode is described.

When the USB cable is connected, the MPU 32 checks the hold switch 37 for its state. If the hold switch 37 is off, the MPU 32 outputs a mode selecting signal (indicated by "MODE SEL") to the USB/ATA bridge 31 so that the USB hard disk unit changes to the normal mode.

When determining that the USB hard disk unit has the normal mode by confirming the mode selecting signal, the USB/ATA bridge 31 performs a Configuration procedure for the personal computer as the USB host.

At this time, when determining that a USB port to which the USB hard disk unit is connected is a low-power port, a DPC terminal remains active. Conversely, when determining that the USB port is a high-power port, the DPC terminal becomes active. After the DPC terminal becomes active, the MPU 32 turns on the power of the HDD 33 by outputting an instruction to the DC/DC converter 39. After that, the electronic device operates as a peripheral device of the personal computer to which the electronic device is connected by USB, that is, it operates as the USB hard disk unit.

Next, the case of the charging mode is described below.

When the hold switch 37 is on at the time the USB cable is connected, the MPU 32 outputs the mode selecting signal (MODE SEL) to the USB/ATA bridge 31 so that the USB hard disk unit has the charging mode.

When determining that the USB hard disk unit has the normal mode by confirming the mode selecting signal, the USB/ATA bridge 31 performs the Configuration procedure for the personal computer as the USB host.

At this time, when determining that a USB port to which the USB hard disk unit is connected is a low-power port, a DPC terminal remains active. Conversely, when determining that the USB port is a high-power port, the DPC terminal becomes active. Even if the DPC terminal becomes active, the MPU 32 initiates charging the MPU 32 by outputting an instruction to the charge/discharge controller 35 without turning on the power of the HDD 33.

In the charging mode, for a command issued from the personal computer as the USB host, the USB/ATA bridge 31 responds so that the USB hard disk unit can be recognized by the system as a removable disk drive having no medium. In addition, when receiving a command such as reading from or writing to media, the USB host can continuously send back an error code representing the "absence of media".

A state in which the removable media has no medium is very common in a floppy disk drive or a CD-ROM drive for a personal computer. Accordingly, if the above error code is sent back, no malfunction occurs in the system, and, based on the absence of media, a reading or writing command is not sent.

In other words, in this method, the USB hard disk unit can be treated by the USB host as a drive having no medium although the USB hard disk unit is a device actually having no removable drive function, so that no serious system error occurs.

Most of processing necessary for emulating the removable drive can be realized by using part of a USB mass storage unit function that a program of the USB/ATA bridge 31 originally has. Thus, an advantage is obtained in that less program modification is necessary compared with the case of emulating a completely different USB device.

Figure 4:
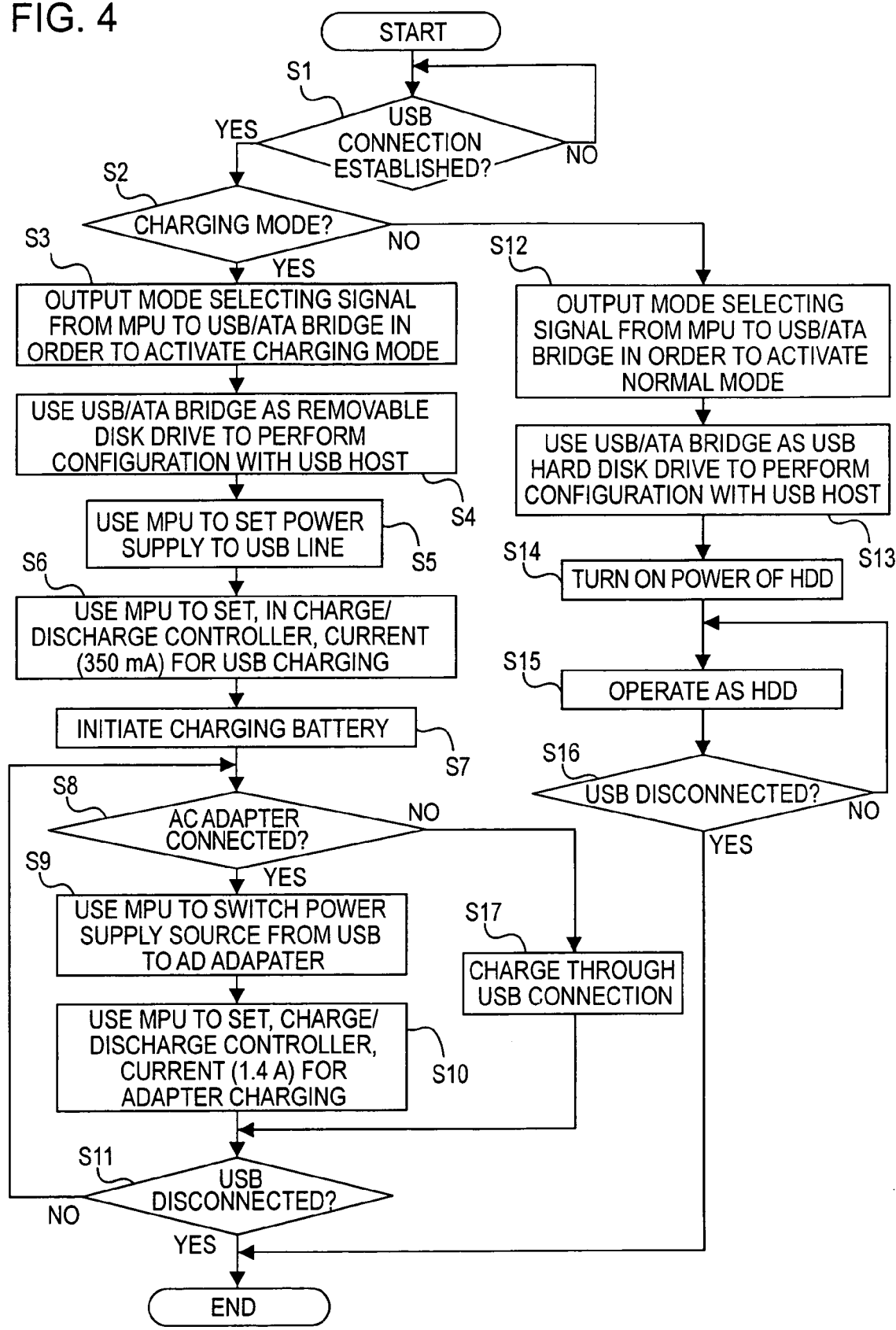
FIG. 4 is a flowchart showing an operating process that is performed by the USB hard disk unit according to the embodiment after the USB hard disk unit is supplied with power.

FIG. 4 is a flowchart showing a process performed by the USB hard disk unit according to this embodiment after it is supplied with power.

When the USB cable is connected (step S1), the USB hard disk unit checks whether it is set in the charging mode (step S2). In this embodiment, by turning on and off of the hold switch 37 when the USB cable is connected, the charging mode is set, as described above.

If the charging mode is set, the MPU 32 outputs a mode selecting signal to the USB/ATA bridge 31 so that the USB hard disk unit changes to the charging mode (step S3).

In response to the mode selecting signal, the USB/ATA bridge 31 performs the Configuration procedure for the personal computer as the USB host so that the USB hard disk unit can operate as a removable disk drive (step S4).

Next, the MPU 32 sets power supply to VBUS of USB (step S5), and sets a charging current (e.g., 350 mA) of VBUS to the charge/discharge controller 35 (step S6). After that, an operation of charging the battery 34 is initiated (step S7).

When the AC adapter detector 38 detects connection of an AC adapter (step S8) during the operation of charging the battery 34, the MPU 32 switches the power supply from the USB cable to the AC adapter (step S9), and sets a charging current (e.g., 1.4 A) of the AC adapter in the charge/discharge controller 35 (step S10). When the AC adapter is not connected, charging of the battery 34 by using the power from the USB cable is continuously performed (step S17).

After that, the USB cable is disconnected (step S11), this process is finished.

If, in step S2, it is determined that the USB hard disk unit is not in the charging mode, that is, the hold switch 37 is off, the MPU 32 outputs the mode selecting signal (MODE SEL) to the USB/ATA bridge 31 so that the USB hard disk unit can operate as an original peripheral device (step S12).

The USB/ATA bridge 31 confirms the mode selecting signal and serves in the normal mode as an external storage unit to perform the Configuration procedure for the personal computer (step S13).

After finishing the Configuration procedure, the power of the HDD 33 is turned on (step S14) and the USB hard disk unit operates as the external storage unit of the personal computer (step S15).

After that, when the USB cable is disconnected (step S16), this process is finished.

In either the charging mode or the normal mode, the USB host according to this embodiment performs the Configuration procedure for the personal computer as the USB host. Accordingly, the personal computer recognizes the USB hard disk unit and issues various types of commands.

In order to avoid the occurrence of a serious system error when the personal computer issues a command in the charging mode, as described above, in the charging mode when the USB cable is connected, the USB/ATA bridge 31 responds so that the USB hard disk unit is recognized by the system as a removable disk drive having no medium. In addition, when receiving a command such as reading from or writing to media, the USB host can continue to send back an error code representing the "absence of media".

The USB hard disk unit according to this embodiment has a self-driven function. Accordingly, the USB hard disk unit operates as a battery-operated portable media player having a built-in hard disk drive, and can therein play back content such as video and music on the hard disk.

Figure 5:
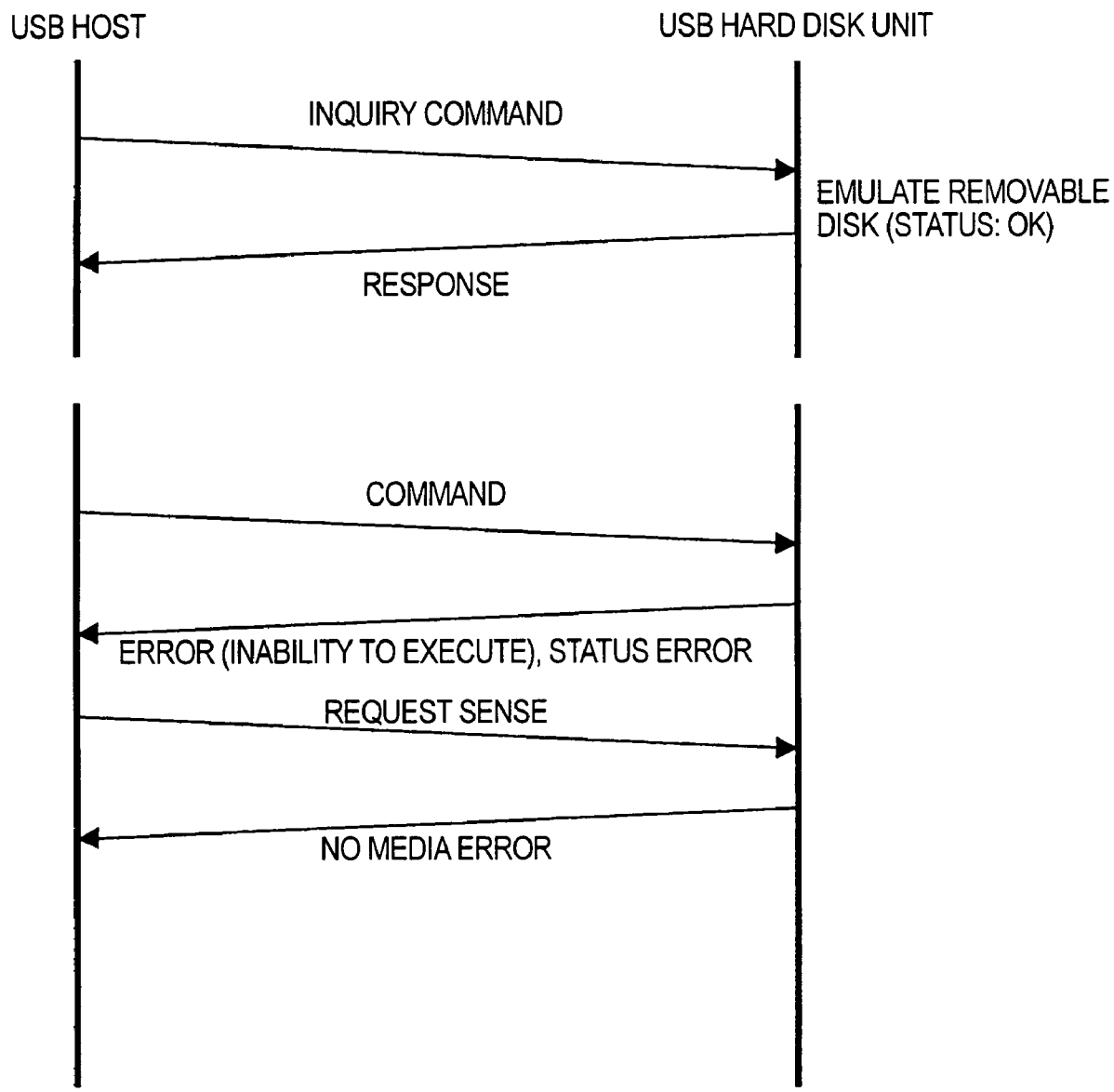
FIG. 5 is a flowchart showing a command sequence performed in a charging mode in association with a USB host by the USB hard disk unit according to the embodiment of the present invention.

FIG. 5 shows a command sequence performed with the USB host by the USB hard disk unit according to this embodiment in the charging mode. The example shown in FIG. 5 is a USB mass storage class command sequence.

At first, when an inquiry command is issued from the USB host, in the charging mode, the USB hard disk unit sends a response which emulates another device so as to be recognized as a removable disk drive, and which indicates that the status of the. USB hard disk unit is normal (OK). For example, in a response message, a removable disk unit is written as a device type.

When a normal command (excluding the inquiry command and a request sense command) is issued from the USB host, the USB hard disk unit sends back an error (inability to execute).

In response thereto, the USB host issues a request sense command for finding the cause of the error. Then, the USB hard disk unit sends back an error indicating that the removable storage unit has no medium loaded therein.

A state in which the removable media has no medium is very common in a floppy disk drive or a CD-ROM drive. Accordingly, if the error is sent back, a malfunction in the USB host does not occur. In addition, based on the absence of media, a command, such as reading or writing, is not sent from the USB host. In other words, the USB hard disk unit emulates a removable disk drive operation, whereby the USB host treats, without any problem, the USB hard disk unit as a drive having no medium loaded therein, so that the occurrence of a serious system error is eliminated.

Figure 6:
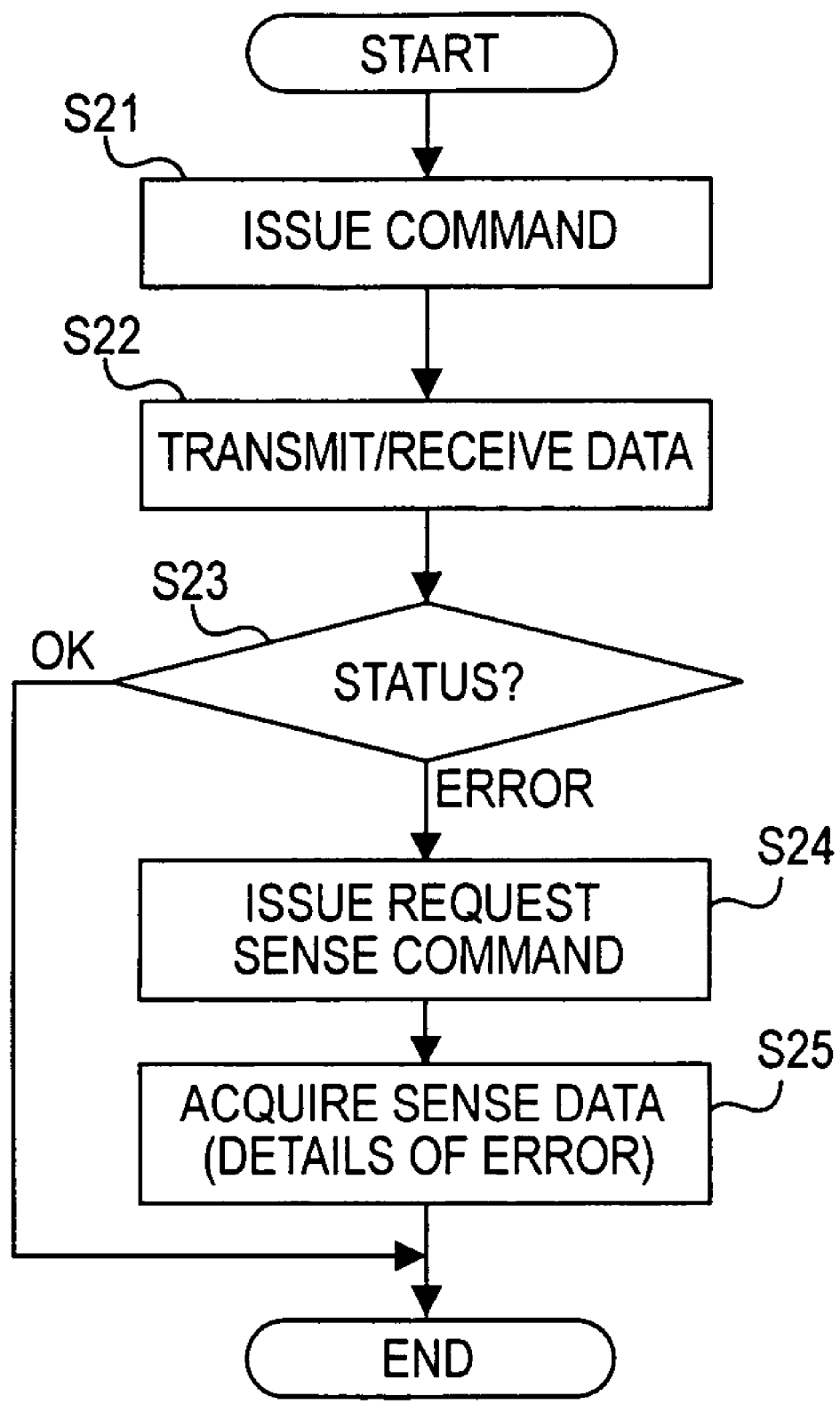
FIG. 6 is a command process performed by a personal computer that operates as a USB host for a USB device connected to the personal computer by USB.

FIG. 6 is a flowchart showing a command process performed for the USB device connected through the USB by the personal computer operating as a USB host.

The USB host issues a command (step S21), and performs data transmission to or data reception from the USB device connected through USB (step S22).

When an error is sent back as a status from the USB device (step S23), the USB host issues a request sense command (step S24). Based on sense data sent back in response to the request sense command, details of the error are obtained (step S25).

Figure 7:
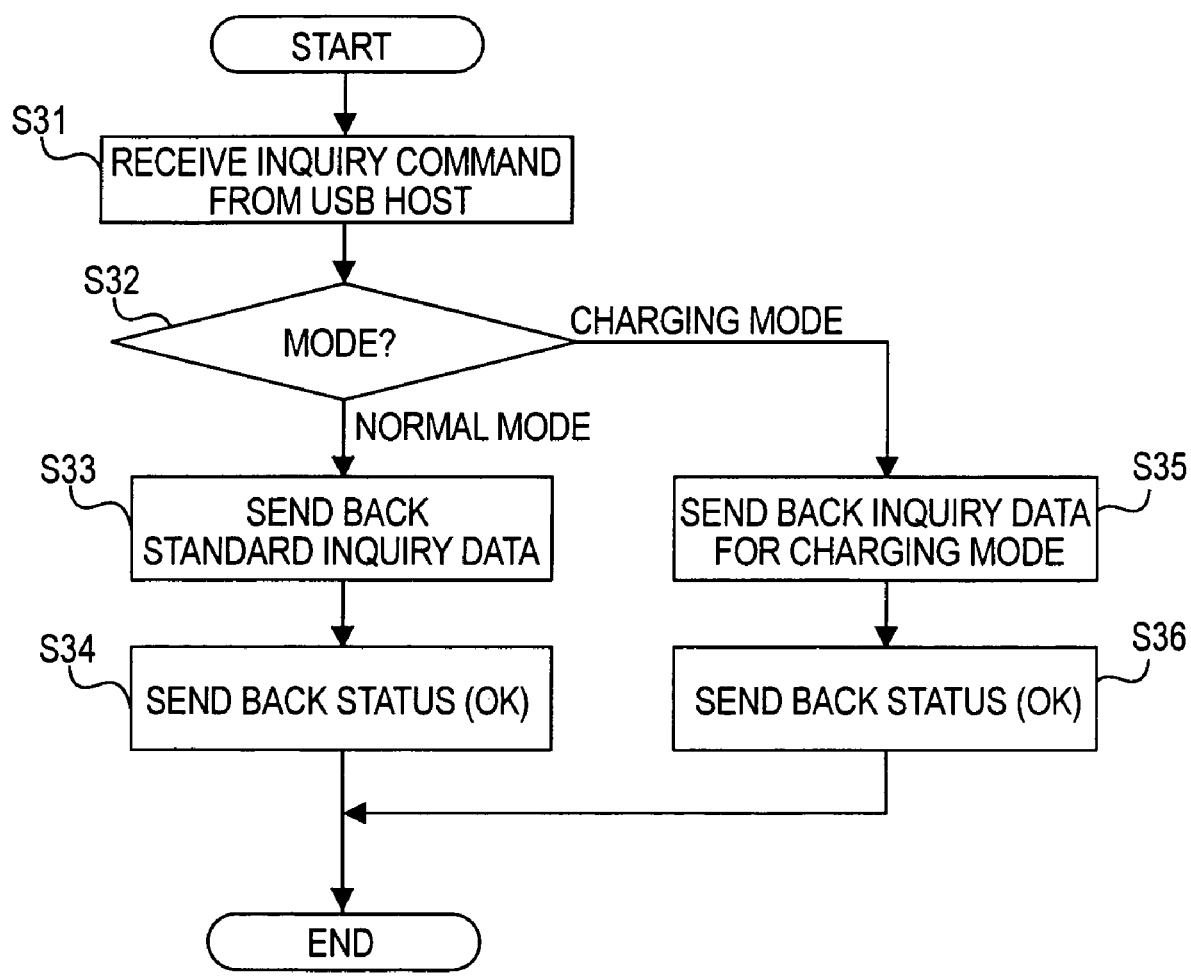
FIG. 7 is a flowchart showing a process that the USB/ATA bridge in the USB device performs for an inquiry command issued from the USB host.

FIG. 7 is a flowchart showing a process that the USB/ATA bridge 31 in the USB device performs for the inquiry command issued from the USB host.

When receiving the inquiry command from the USB host (step S31), the USB/ATA bridge 31 confirms the operating mode of the USB device (step S32). The operating mode can be confirmed based on the mode selecting signal output from the USB/ATA bridge 31, or the on/off state of the hold switch 37.

When the USB device operates in the normal mode, the USB/ATA bridge 31 sends back standard inquiry data to the USB host (step S33), and indicates a normal status (indicated by OK) (step S34).

When the USB device operates in the charging mode, the USB/ATA bridge 31 sends back inquiry data for the charging mode to the USB host (step S35), and indicates a normal status (OK) (step S36).

Figure 8:
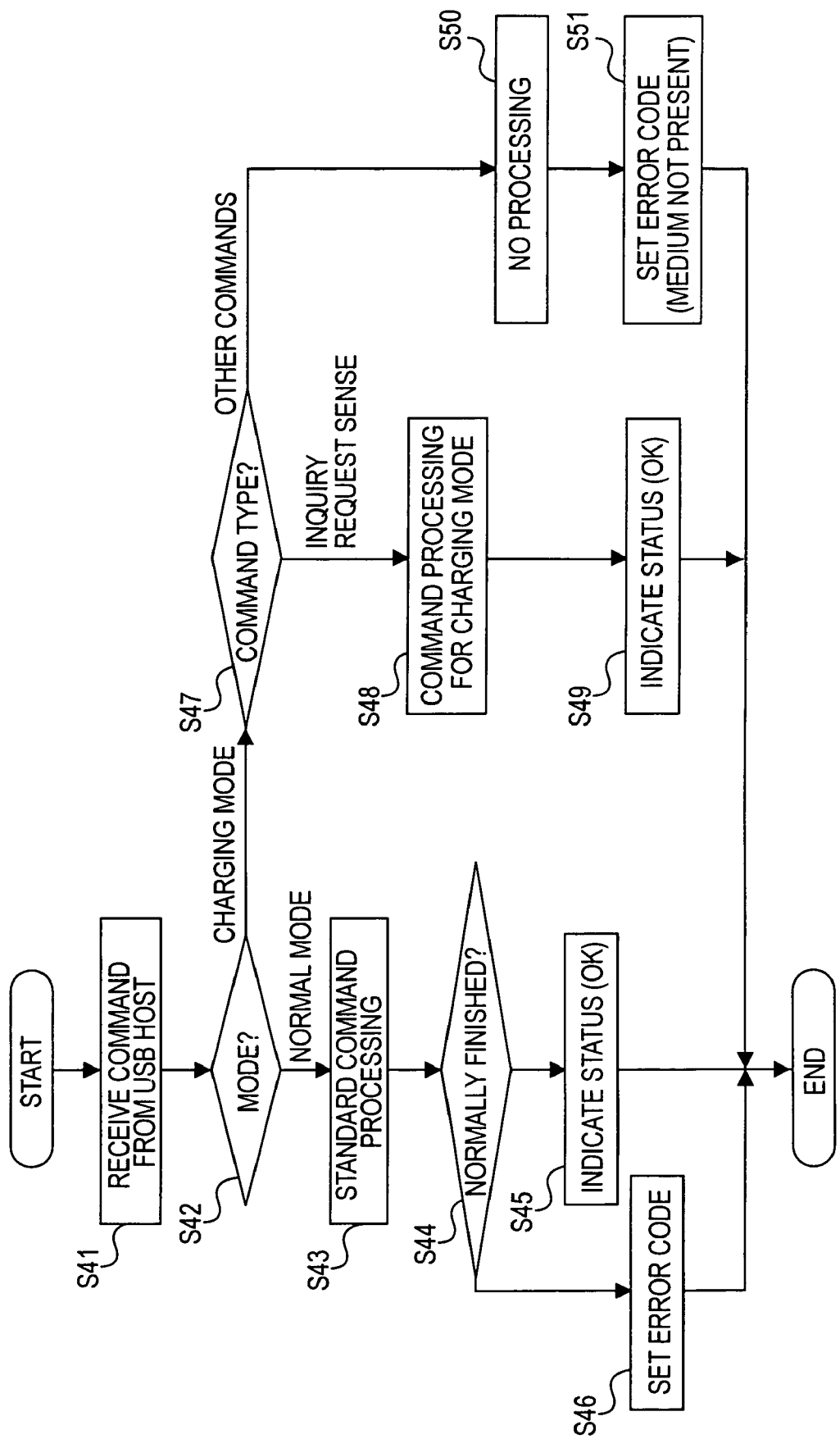
FIG. 8 is a flowchart showing a process that the USB/ATA bridge in the USB device performs for a command issued from the USB host.

FIG. 8 is a flowchart showing a process that the USB/ATA bridge 31 in the USB device performs for a command issued from the USB host.

When receiving a command from the USB host (step S41), the USB/ATA bridge 31 confirms the operating mode of the USB device (step S42). The operating mode can be confirmed based on the mode selecting signal output from the USB/ATA bridge 31, or the on/off state of the hold switch 37.

When the USB device operates in the normal mode, the USB/ATA bridge 31 performs standard command processing (step S43). The USB/ATA bridge 31 confirms whether or not the command processing has normally finished (step S44). If the command processing has normally finished, the USB/ATA bridge 31 indicates a normal status (OK) (step S45). If the command processing has not normally finished, an error code is set (step S46).

When the USB device operates in the charging mode, the USB/ATA bridge 31 checks the command from the USB host for its type (step S47).

When the command from the USB host is an inquiry or request sense command, command processing for the charging mode is performed (step S48) and a normal status (OK) is indicated (step S49).

If the command from the USB host is a command other the inquiry and request sense command, the command processing is not performed (step S50), and an error code representing "Media Not Present" is, set (step S51).

Even if the USB hard disk unit according to this embodiment is connected, not as the USB device, to the USB host for charging, it performs the Configuration procedure and is correctly recognized by the USB host, thus causing no malfunction in the USB host and other USB devices.

In addition, in the charging mode, as described with reference to FIG. 5, the USB hard disk unit according to this embodiment serves as another emulated device to respond to a command from the USB host, whereby the occurrence of a serious error in the USB host can be avoided.

An operating program in the charging mode for such emulation has a small difference from an operating program in the normal mode. Thus, the operating program in the charging mode can be realized by minimum program modification, thus reducing a development period and cost.

When, in the charging mode, in response to the inquiry command from the USB host, the USB/ATA bridge 31 sends back a response message indicating that the USB hard disk unit is a removable disk drive, in a particular field of the response message, a character string for use in recognizing that the electronic device is in the charging mode may be written in a form matching the format of the device-identification-information field by the USB/ATA bridge 31. Alternatively, in the device-identification-information field, a character string by which the state of the electronic device or a component included in the electronic device is recognizable may be written in a form matching the format of the field.

For example, in the device-identification-information field included in the response message, "INACTIVE DEVICE" is written. Alternatively, in a device name field, a component name, such as a hard disk, is additionally written.

Figure 9:
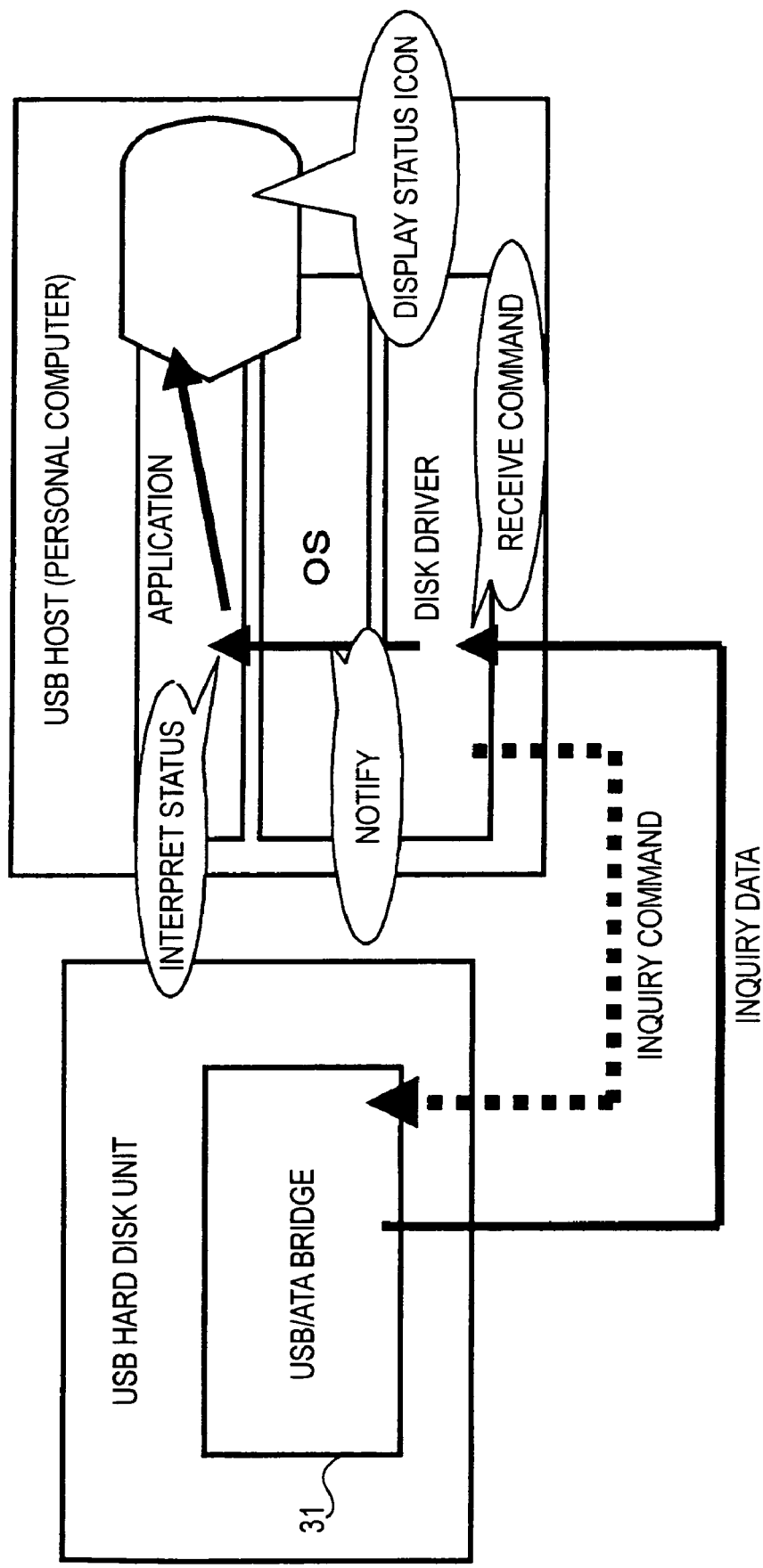
FIG. 9 is an illustration of an operation performed when the USB hard disk unit emulates a removable disk drive in the charging mode and responds to the inquiry command.

In such a case, the USB host, which issues the inquiry command and receives the response message, can normally process the response message without changing a program of a device driver for performing hardware operation of the electronic device as a peripheral device. In addition, an application that processes a substantial content of the response message can accurately interpret the meaning of "INACTIVE DEVICE" and can detect a state in which the electronic device is in the charging mode (see FIG. 9).

Figure 10:
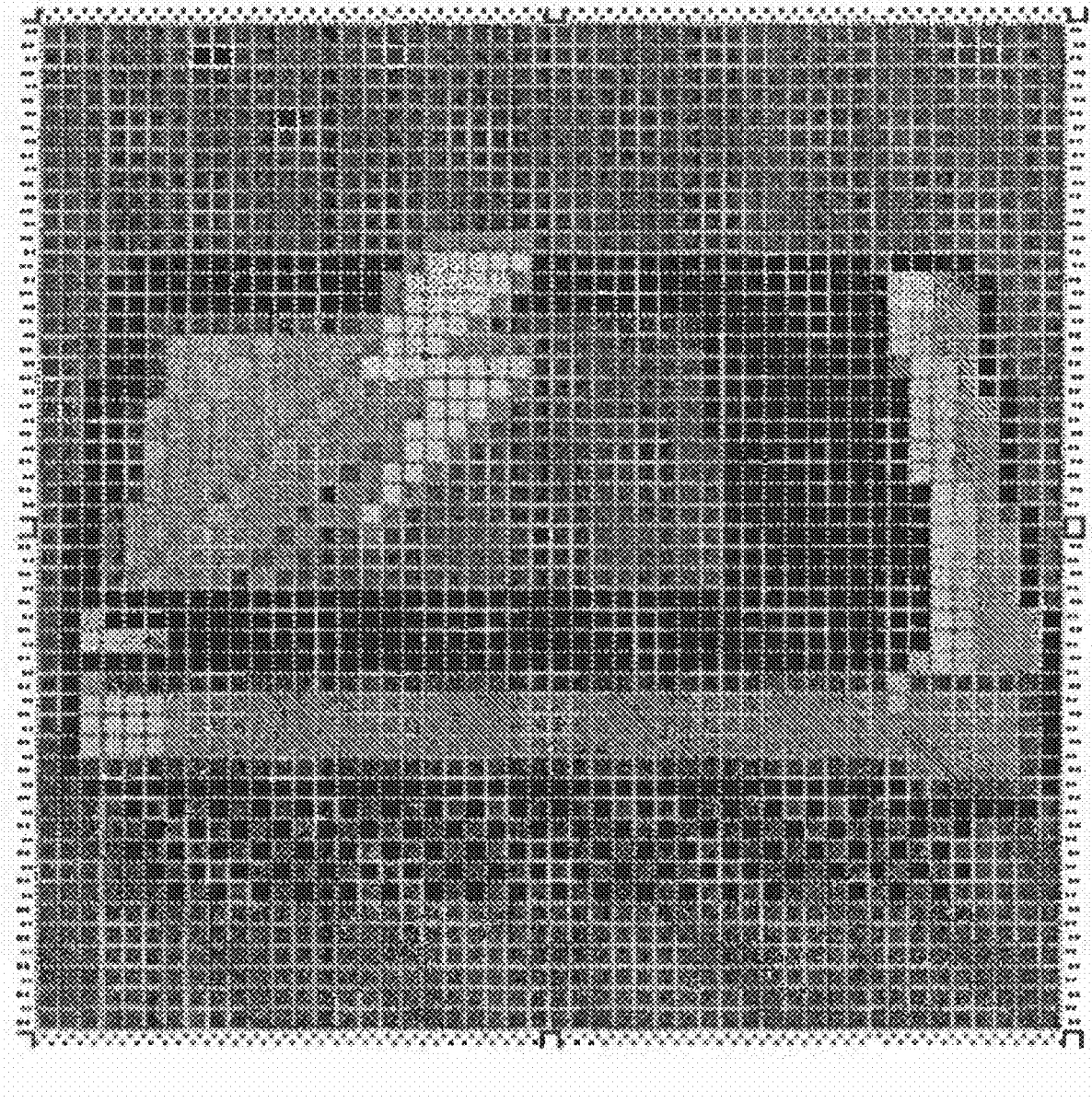
FIG. 10 is an illustration of a display example of a charging mode icon.
Figure 11:
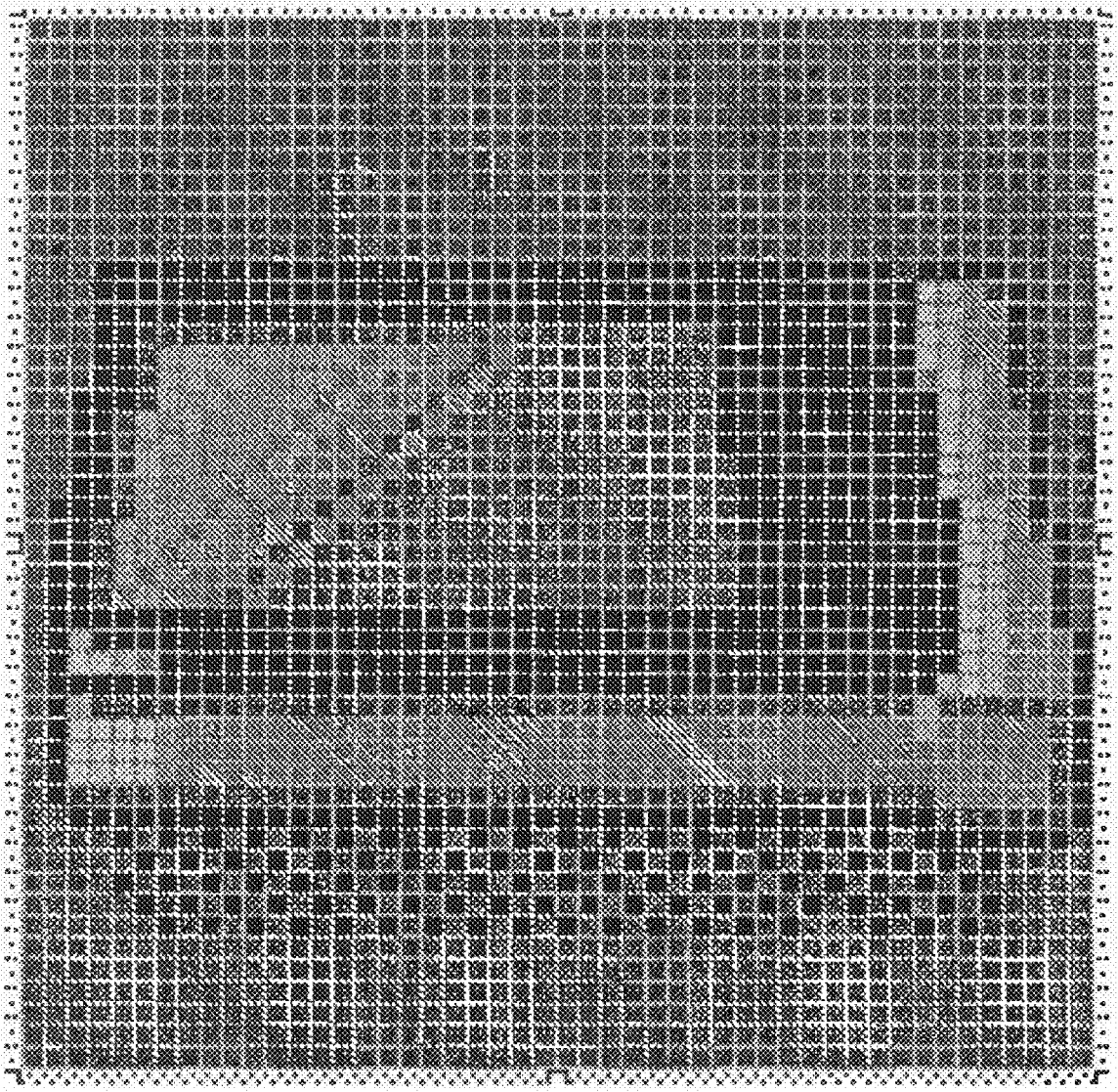
FIG. 11 is an illustration of a display example of a normal mode icon.

Moreover, in response to the above, a charging-mode icon and normal-operating-mode icon of the USB hard disk unit can be displayed on the desktop. FIGS. 10 and 11 show the charging-mode icon and the normal-operating-mode icon, respectively.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device capable of operating as a hard disk unit of an information processing apparatus, the electronic device comprising:
    connecting means for connecting to the information processing apparatus;
    command processing means for processing a command sent from the information processing apparatus through said connecting means;
    a rechargeable battery;
    charging control means for controlling a charging operation of said rechargeable battery; and
    operating mode managing means which does not include a mode selecting switch, said operating mode managing means responsive to said connecting means being connected to an interface having a power-supply function, selects one of a normal operating mode in which the electronic device operates as the hard disk unit of the information processing apparatus, and a charging mode in which the electronic device stops operating as a hard disk unit of the information processing apparatus and charges said rechargeable battery,
    wherein said command processing means processes the command in accordance with the selected operating mode.

2. The electronic device according to claim 1,
    wherein, in the charging mode, said command processing means emulates a response of another electronic device so that the information processing apparatus is prevented from malfunctioning although the electronic device stops operating as the hard disk unit of the information processing apparatus.

3. The electronic device according to claim 2, further comprising a storage unit installed in the electronic device,
    wherein:
    in the normal operating mode, said operating mode managing means allows said storage unit to operate as the hard disk unit of the information processing apparatus, and, in the charging mode, said operating mode managing means stops an operation of said storage unit; and
    in the normal operating mode, said command processing means serves as an external storage unit to normally process the command from the information processing apparatus, and, in the charging mode, the command processing means serves as a removable storage unit to process the command from the information processing apparatus.

4. The electronic device according to claim 3, wherein, in the charging mode, in response to the command from the information processing apparatus, said command processing means sends back an error indicating that no medium is loaded in the removable storage unit.

5. The electronic device according to claim 3, wherein, in the charging mode, in response to an inquiry command from the information processing apparatus, said command processing means sends back a response message indicating that the electronic device is a removable storage unit.

6. The electronic device according to claim 3, wherein, in the charging mode, in a device-identification-information field included in a message given in response to an inquiry command from the information processing apparatus, a character string for use in recognizing that the electronic device is in the charging mode is written in a form matching the format of the device-identification-information field by said command processing means.

7. The electronic device according to claim 3, wherein, in the charging mode, in a device-identification-information field included in a message given in response to an inquiry command from the information processing apparatus, a character string by which a state of the electronic device or a component included in the electronic device is recognizable in a form matching the format of the device-identification-information field by said command processing means.

8. The electronic device according to claim 1, further comprising a hold switch which, when the electronic device is not connected to the information processing apparatus by said connecting means, designates one of enabling and disabling of a key operation in a state in which the electronic device is self-driven, said self-driven electronic device, when key enabled, serves as a portable media player for playing back content including video and music,
    wherein, when the electronic device is connected to the information processing apparatus by said connecting means, in a state in which the hold switch is off, said operating mode managing means selects the normal operating mode in which the information processing apparatus operates as a hard disk unit of the information processing apparatus, and, in a state in which the hold switch is on, said operating mode managing means selects the charging mode in which the electronic device stops operating as the hard disk unit of the information processing apparatus and charges said rechargeable battery.

9. A method for controlling an electronic device capable of operating as an external device of an information processing apparatus, the electronic device including a rechargeable battery, the method comprising the steps of:
    when the electronic device is connected to an interface having a power-supply function,
    performing operating-mode management of a device that does not include a mode selection switch, said operating mode management being responsive to connection of the electronic device to the interface by selecting one of a normal operating mode in which the electronic device operates as a hard disk unit of the information processing apparatus, and a charging mode in which the electronic device stops operating as the hard disk unit of the information processing apparatus and charges the rechargeable battery; and
    performing command processing in accordance with the selected operating mode.

10. An information processing system having a peripheral device, the information processing system comprising:
    a user interface for providing a user operating environment using a display screen;
    connecting means for connecting to the peripheral device;
    operating status acquiring means for acquiring an operating status of the peripheral device by using said connecting means;

operating status display means for displaying, on the display screen, a status icon indicating the operating status of the peripheral device acquired by said operating status acquiring means, said connecting means has a power-supply function;

responsive to connection of the connecting means to the peripheral device, the peripheral device includes an operating mode managing unit which does not include an operating mode selecting switch, said operating mode managing unit selecting one of a normal operating mode for operating as a hard disk unit for the information processing system, and a charging mode for stopping the peripheral device operation and performing charging by using the power-supply function; and said operating status display means displays one of a normal-operating-mode icon and a charging-mode icon.

11. A computer program product having a memory with instructions in a computer-readable form that when executed on a computer system, control an electronic device including a rechargeable battery and being capable of operating as an external device of an information processing apparatus-by performing the steps comprising:

when the electronic device is connected to an interface having a power-supply function, performing operating-mode management which does not include an operating mode selecting switch by selecting one of a normal operating mode in which the electronic device operates as a hard disk unit of the information processing apparatus, and a charging mode in which the electronic device stops operating as the hard disk unit of the information processing apparatus and charges the rechargeable battery; and performing command processing in accordance with the selected operating mode.

12. An electronic device capable of operating as a hard disk unit of an information processing apparatus, the electronic device comprising:

a connecting unit connecting to the information processing apparatus;

a command processor processing a command sent from the information processing apparatus through said connecting unit;

a rechargeable battery;

a charging controller controlling a charging operation of said rechargeable battery; and an operating mode managing unit which does not include a mode selecting switch, said operating mode managing unit selecting, responsive to said connecting unit being connected to an interface having a power-supply function, one of a normal operating mode in which the electronic device operates as the hard disk unit of the information processing apparatus, and a charging mode in which the electronic device stops operating as the hard disk unit of the information processing apparatus and charges said rechargeable battery, wherein said command processor processes the command in accordance with the selected operating mode.

13. The electronic device of claim 1, wherein said connecting means permits transfer of data and voltage.

14. The information processing apparatus of claim 10, wherein said connecting means permits transfer of data and voltage.

15. The electronic device of claim 12, wherein said connecting unit permits transfer of data and voltage.

* * * * *